Aug. 19, 1969   L. TINFOW ET AL   3,461,644
APPARATUS AND METHODS FOR MANUFACTURING
A SIMULATED BLISTER PACK
Filed Oct. 22, 1965   3 Sheets-Sheet 3
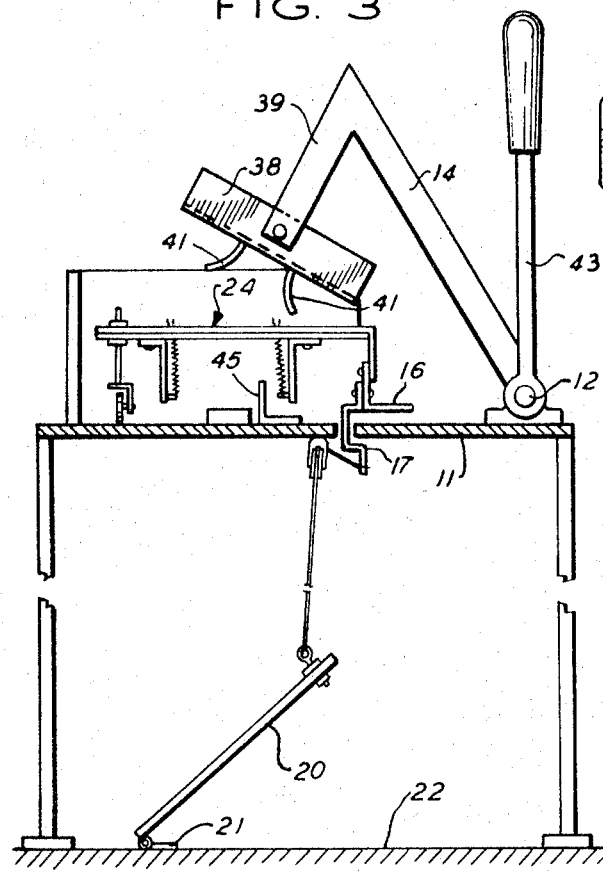
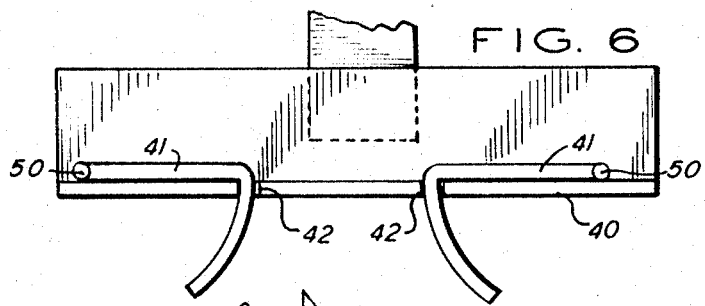
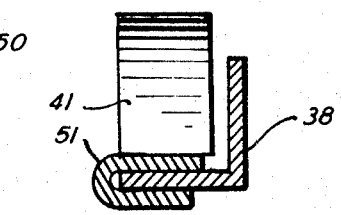
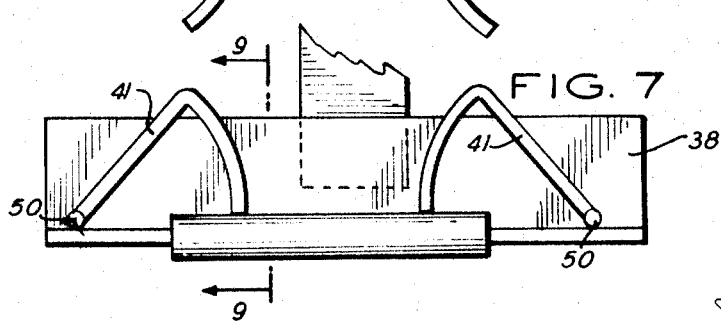
INVENTORS
LIONEL TINFOW
SIDNEY WINTON
ATTORNEY United States Patent Office 3,461,644
Patented Aug. 19, 1969

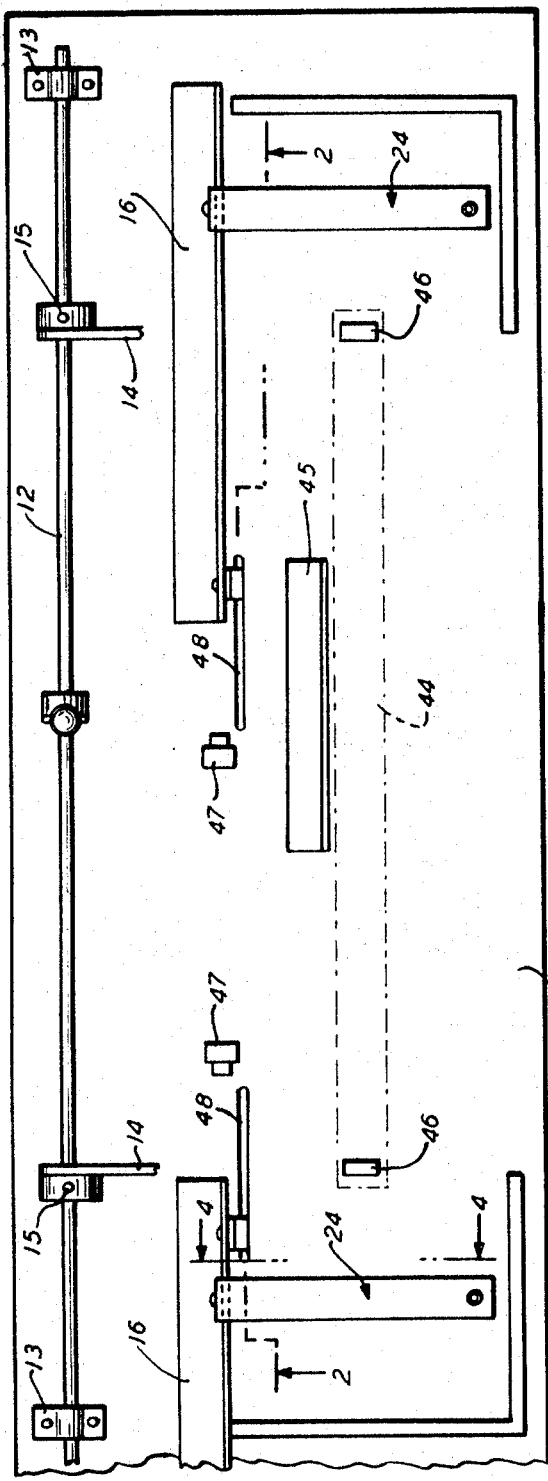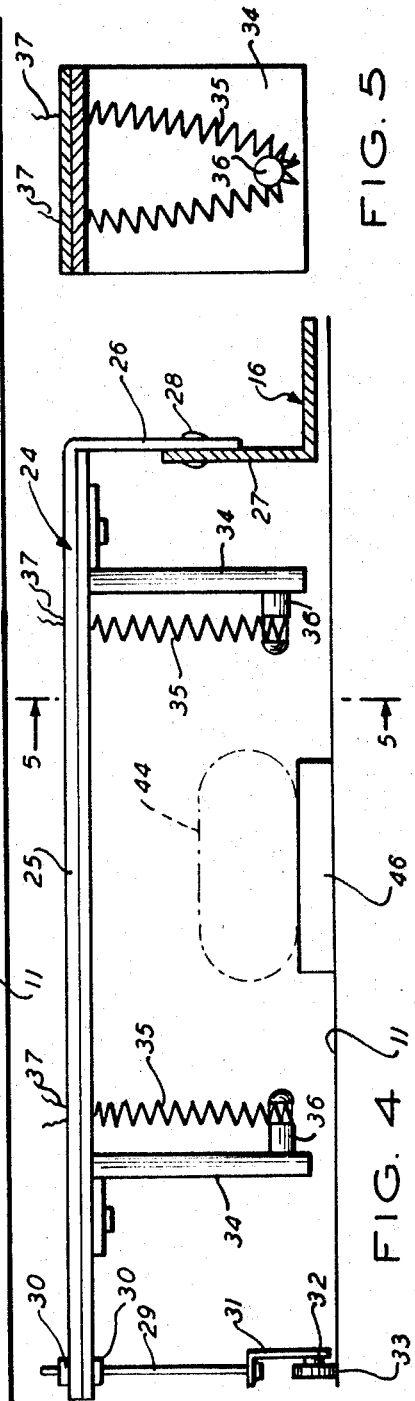

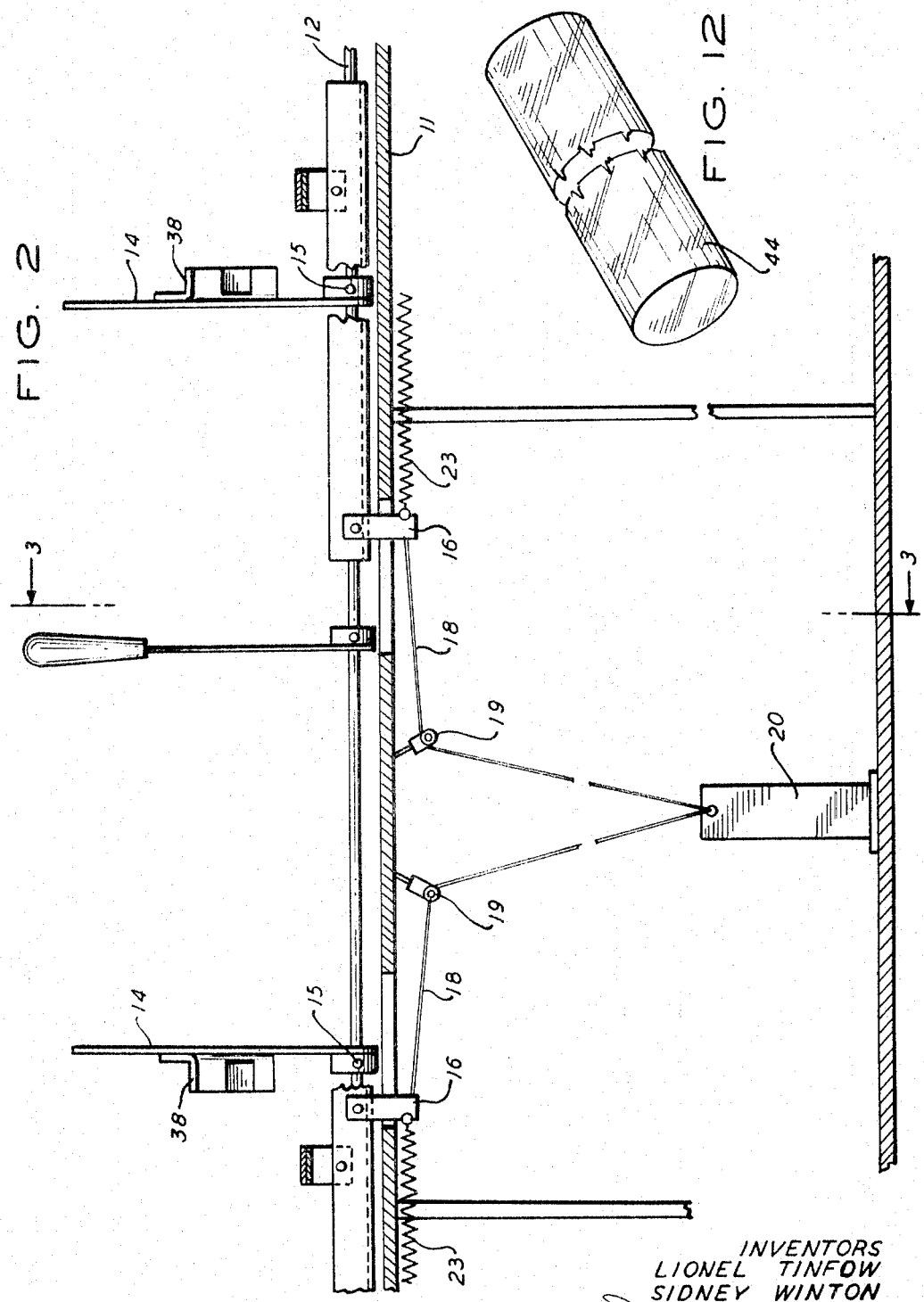

3,461,644
APPARATUS AND METHODS FOR MANUFACTURING A SIMULATED BLISTER PACK
Lionel Tinfow, 24 Oak Place, North Caldwell, N.J., and Sidney V. Winton, 5572 Netherland Ave., New York, N.Y
Filed Oct. 22, 1965, Ser. No. 501,908
Int. Cl. B65b 7/06, 51/26
U.S. Cl. 53—39
3 Claims

ABSTRACT OF THE DISCLOSURE

Apparatus and methods for manufacturing a simulated blister pack wherein the ends of a tubular thermoplastic member are radiantly heated to tacky plasticity and thereafter engaged by relatively cool deforming means to deform the said ends into engagement with itself, the ends cooling while so engaged, sufficiently to permit sealing with itself.

---

Our invention relates to apparatus and methods for manufacturing packages generally and specifically to apparatus and methods for manufacturing a simulated, transparent blister pack.

Blister packs are well accepted in the packaging arts but are extremely costly. The blister pack provides an opportunity to seal an article of merchandise against damage and yet expose it to visual examination beneath a transparent plastic bubble. In addition, the blister pack, in combination with a backing card, provides means for attaching and supporting relatively heavy or sharp objects which normally cannot be packaged loosely within a relatively thin plastic shell. Moreover, the backing card provides a surface to apply advertising, descriptive material, trademarks and the like. However, in the extremely competitive hardware arts, where the profit margin is normally extremely low, the blister pack has frequently been found to be too expensive.

Therefore, it is among the objects and advantages of our invention to provide apparatus and methods for manufacturing an inexpensive, simulated blister pack.

Another object of our invention is to provide apparatus and methods for manufacturing a simulated blister pack from rolls of inexpensive, continuous, tubular, transparent thermoplastic such as polyethylene and the like.

Still another object of our invention is to provide apparatus and methods for manufacturing a simulated blister pack in which the article of merchandise, mounted on a backing card is inserted into a length of generally tubular, transparent thermoplastic and the ends thereafter are simultaneously heated to tacky plasticity and compressed against each other progressively first from the sides and then from the top inwardly and downwardly against itself and/or a backing sheet.

Still another object of our invention is to provide apparatus and methods for manufacturing simulated blister packs in which the heated thermoplastic, transparent outer shell forms a strong, tight hermetic seal with itself and the backing card yet does not discolor, scorch, cloud or otherwise lose its overall aesthetically pleasing appearance.

A further object of our invention is to provide apparatus and methods for manufacturing simulated blister packs in which a single operator can quickly and easily perform a sealing operation with a combined movement of the arm and leg.

These objects and advantages as well as other objects and advantages may be achieved by our invention and methods shown in the drawings annexed hereto and described in the specification in which:

FIGURE 1 is a top plan view of our apparatus for preparing simulated blister packs;

FIGURE 2 is a side elevational view of our apparatus taken along lines 2—2 in FIGURE 1 looking in the direction of the arrow;

FIGURE 3 is an end elevational view of our apparatus taken along line 3—3 in FIGURE 2;

FIGURE 4 is an end elevational view of a movable heating element carrier taken along line 4—4 in FIGURE 1;

FIGURE 5 is a side elevational view of a single heating element taken along line 5—5 in FIGURE 4;

FIGURE 6 is an end elevational view of one mechanical former shown in FIGURE 3;

FIGURE 7 is an end elevational view of an alternative former;

FIGURE 8 is a side elevational view of the former shown in FIGURE 6;

FIGURE 9 is a side elevational cross-sectional view of the alternative former shown in FIGURE 7 taken along line 9—9 looking in the direction of the arrow;

FIGURE 10 is a top plan view of our blister pack;

FIGURE 11 is a side elevational broken away view of one end of our simulated blister pack;

FIGURE 12 is a broken away view in perspective of the tubular transparent thermoplastic member from which the simulated blister pack is formed.

Referring now to the drawings in detail, our apparatus comprises the table 11. A shaft 12 is mounted on the top of the table 11 by a pair of frictionless bearing supports 13—13. A pair of spaced apart, off set arms 14, 14 are keyed to the shaft 12 for rotation therewith, by set screws 15, 15.

A pair of angle irons 16, 16 are slidably mounted on the table 11 and spaced in front of and parallel to the shaft 12. The angle irons 16, 16 are slidable toward and away from each other over the surface of the table 11 along a common axis parallel to the shaft 12.

A generally U-shaped carrier 17 is secured to each angle iron 16 extending downwardly through a slot 48 in the table 11. The bottom of the carrier 17 is attached to a cord 18 which passes through a pulley 19 located between the angle irons 16, 16 and from thence downwardly to a foot operated treadle 20. The foot treadle 20 is normally in a raised position disposed in an angle to the floor 22 and is hingedly secured to a base 21. Depression of the treadle 20 pulls the carriers 16, 16 inwardly toward each other against the normal urging of a pair of opposing springs 23, 23 each of which is attached to one of the respective carriers 16, 16 and the bottom of the table 11.

Attached to each angle iron 16 is a transversely movable heating element carrier 24. The heating element carriers 24, 24 each comprise a generally horizontal top member 25 having a depending end flange 26. The end flange 26 is secured to the vertical wall 27 of the angle iron 16 by means of a rivet 28.

A generally vertical shaft 29 depends from the opposite side of the top member 25 and is secured thereto by a pair of nuts 30, 30. Of course, the topmost end of the shaft 29 must be threaded to receive the nuts 30, 30. An inverted offset wheel support 31 is attached to the bottom of the shaft 29. An axle 32 is mounted on the depending wheel support 31 in a generally horizontal plane and a wheel 33 is rotatably mounted thereon. The wheel 33 is in engagement with and rolls upon the top of the table 11. Thus, when the treadle 20 is depressed, the heating element carriers 24, 24 move inwardly toward each other along the surface of the table.

A pair of opposed, spaced-apart heating element supports 34, 34 depend from the bottom of the top member 25 of each carrier 24. An electrical heating element 35 extends from the top member 25 downwardly and around an insulated post 36 on each support 34. The heater elements 35, 35 are each provided with insulated leads 37, 37 which extend through the top member 25 of the carrier 24 and are connected to a suitable source of electricity.

The offset arms 14, 14 are each provided with an angle iron 38 pivotally mounted to the end of its offset member 39. The angle defined by the offset member 39 is such that the member 39 extends vertically downwardly when the angle iron 38 engages the top of the table 11.

A pair of arcuate formers 41, 41 are pivotally mounted to the angle iron 38 extending downwardly through openings 42, 42 in the horizontal bottom leg 40 thereof. The formers 41, 41 are invested with their pivotal action by means of pivot pins 50, 50. A control arm 43 is keyed to the shaft 12 and is adapted to rotate the shaft 12 and the arms 14, 14 causing the angle irons 38, 38 to descend to the surface of the table 11.

In operation, a backing card 49 with the article of merchandise mounted thereon is inserted within a measured length of transparent thermoplastic tubing 44. The tube 44 is positioned against a guide 45 on the table 11, the ends thereof resting upon blocks 46, 46. The treadle 20 is depressed pulling the heating element carriers 24, 24 inwardly against the springs 23, 23 until the heating elements 35, 35 are adjacent to the respective end of the tube 44. Stops 47, 47 which are laterally adjustable, may be conveniently mounted on the top of the table 11 to engage the angle irons 16, 16 thereby limiting their inward movement and in turn limiting the inward movement of the heating element carriers 24, 24. Thus, the stops 47, 47 may be positioned for a wide variety of tube 44 lengths.

As the heating element carriers 24, 24 move inwardly, a suitable electrical switch closes energizing the heater elements 35, 35. The elements 35, 35 quickly soften the ends of the thermoplastic tube 44 adjacent to the blocks 46, 46. The control arm 43 is then pulled forwardly by the operator causing the offset arms 14, 14 to rotate carrying the offset members thereof 39, 39 downwardly. The arcuate formers 41, 41 on the angle irons 38, 38 first engage the sides of the tube which have previously been softened by the heat shaping and collapsing them inwardly. The bottom 40 of the angle iron 38 thereafter engages the top of the tube 44 crushing it and at least a portion of the inwardly deformed sides downwardly against the block 46. Since the tube 44 is relatively tacky from the heat, the plastic seals against the backing card 49 and itself forming a strong, tight hermetic seal. The type of seal produced can best be seen in FIGURES 10 and 11. The control arm 43 is then pushed rearwardly withdrawing the angle irons 38, 38 upwardly to free the tube 44 from the blocks 46, 46. The thermoplastic has no tendency to adhere to the blocks 46.

Of course, the arcuate formers 41, 41 which first engage the sides of the tube 44 must pivot upwardly as the angle iron 38 descends in order to permit the bottom leg 40 thereof to engage the top of the tube 44. To this end, the pins 50, 50 permit rotation of the arcuate members 40, 40 upwardly through the openings 42, 42 in the bottom horizontal leg 40. In some cases, it is desirable to retain the formers 41, 41 in an upwardly disposed position so that they never engage the tube 44. To this end, a U-shaped stop 51 is fitted over the bottom leg 40 of the angle iron 38 to hold the arcuate formers 41, 41 in the upper position. Thus, the deforming action is all downward with respect to the tube 44.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

We claim:
1. A method for manufacturing a simulated blister pack comprising,
   (a) radiantly heating opposed terminal ends of a generally tubular thermoplastic member while in a generally tubular configuration until at least portions thereof achieve tacky plasticity,
   (b) engaging relatively cool deforming means to said ends while still tacky to collapse and substantially close the tubular configuration of said ends until the tacky portions cool sufficiently to adhere and retain the collapsed configuration of said ends,
   (c) supporting each said end from beneath during deformation,
   (d) deforming said ends laterally inwardly to a limit and simultaneously deforming said ends from the top downwardly to compress the collapsed ends against the support beneath.
2. A method for manufacturing a simulated blister pack comprising,
   (a) the procedure in accordance with claim 1 in which,
   (b) the said opposed sides are deformed inwardly and downwardly.
3. A method for manufacturing a simulated blister pack comprising,
   (a) the procedure in accordance with claim 2 in which,
   (b) the ends of the tube are supported from beneath on a plane above the plane of the portion of the tubular member between the ends.

References Cited

UNITED STATES PATENTS

| 1,953,097 | 3/1934 | Becker | 53—39 X |
| 2,691,474 | 10/1954 | Olson | 53—373 X |
| 3,313,084 | 4/1967 | Forman | 53—22 |
| 2,356,472 | 8/1944 | Rothaug | 53—39 XR |
| 2,557,975 | 6/1951 | King | 53—373 |
| 2,656,082 | 10/1953 | Brown | 53—255 XR |
| 2,707,584 | 5/1955 | Hoover et al. | 53—37 XR |

THERON E. CONDON, Primary Examiner

E. F. DESMOND, Assistant Examiner

U.S. Cl. X.R.

53—373